No. 643,586. Patented Feb. 13, 1900.
N. BARRY, Jr.
BUTTON MAKING MACHINE.
(Application filed May 1, 1899.)

(No Model.) 2 Sheets—Sheet 1.

Witnesses:
H. S. Austin.
James R. Mansfield.

Inventor:
Nicholas Barry Jr
By
Alexander & Dowell
Attys.

No. 643,586. Patented Feb. 13, 1900.
N. BARRY, Jr.
BUTTON MAKING MACHINE.
(Application filed May 1, 1899.)

(No Model.) 2 Sheets—Sheet 2.

Witnesses:
H. S. Austin.
James R. Mansfield.

Inventor,
Nicholas Barry Jr.
By:
Alexander & Dowell
Atty's.

UNITED STATES PATENT OFFICE.

NICHOLAS BARRY, JR., OF MUSCATINE, IOWA.

BUTTON-MAKING MACHINE.

SPECIFICATION forming part of Letters Patent No. 643,586, dated February 13, 1900.

Application filed May 1, 1899. Serial No. 715,199. (No model.)

*To all whom it may concern:*

Be it known that I, NICHOLAS BARRY, Jr., of Muscatine, in the county of Muscatine and State of Iowa, have invented certain new and useful Improvements in Button-Making Machines; and I hereby declare that the following is a full, clear, and exact description thereof, reference being had to the accompanying drawings, which form part of this specification.

This invention is an improvement in button facing or finishing machines; and its object is to provide an improved device by which the blanks are held and presented to the dressing or finishing tools, the particular object of the invention being to provide a device by which the blanks, although of varying thickness or diameter, will all be finished exactly alike and the buttons be entirely uniform in thickness and in which injury to the tool by contact of the chuck with the cutter or finishing-tool is impossible.

The blanks from which pearl buttons are made are generally cut by tube-saws, which are made from sheet-steel and the teeth filed into them and then set, varying considerably in size. As they are generally set by hand, the operator may get them one-fortieth of an inch larger or one-fortieth of an inch smaller than the size wanted, and when the disks are put in chucks if the disks are overlarge they extend the chucks more and if under size they expand the chucks less, which variations in expansion of the chuck in the ordinary styles of machines results in an unequal presentation of the blanks to the cutter, and consequently unequal formation of the buttons.

By my invention regardless of the size of the blank the chuck closes and stops at a fixed point, so that the operator may set the machine in the morning and run it until night without further adjustment, and the tool will never run into the chuck or the chuck into the tool.

The invention therefore consists in the novel construction and combination of parts set forth in the claims and hereinafter described in detail, and illustrated in the accompanying drawings, in which—

Figure 1:
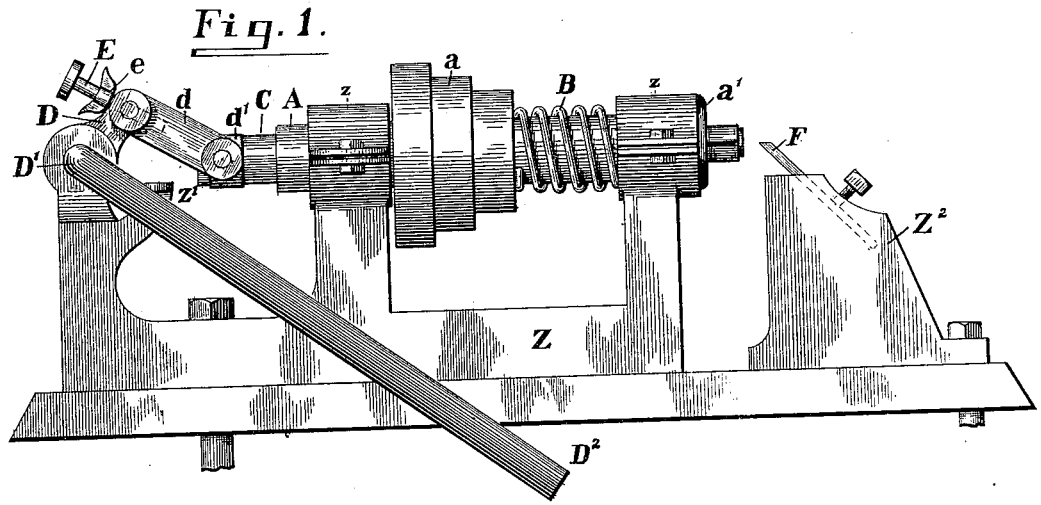
Figure 2:
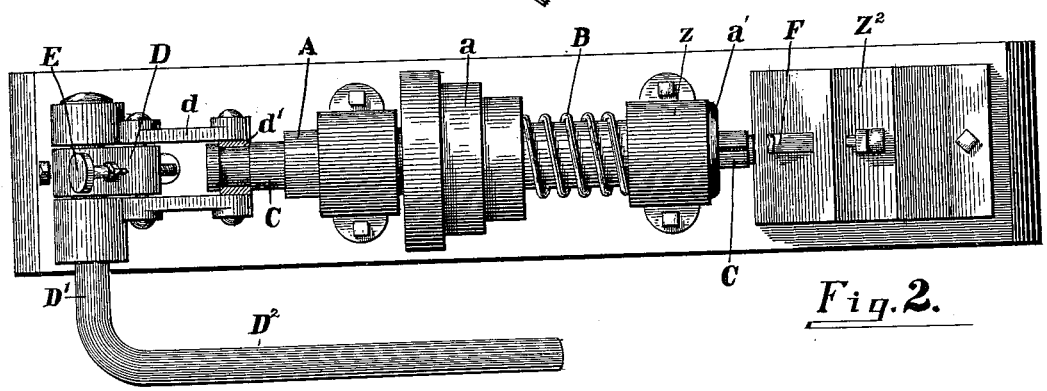
Figure 6:
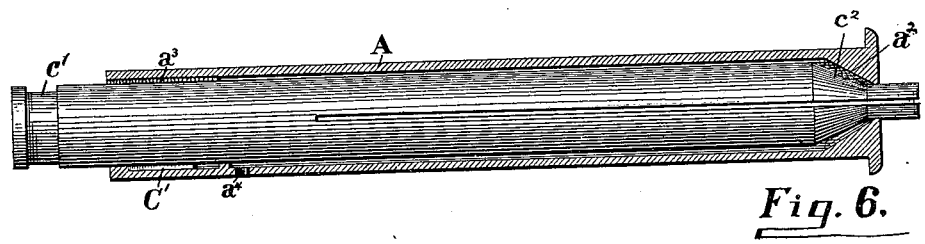
Figure 7:
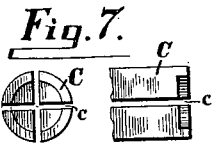
Figure 3:
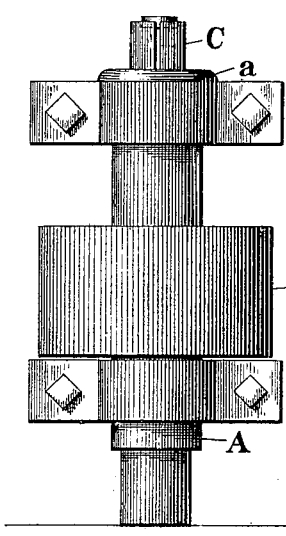
Figure 4:
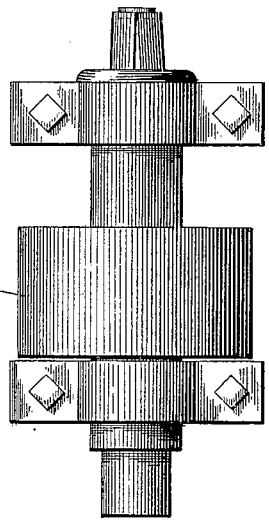
Figure 5:
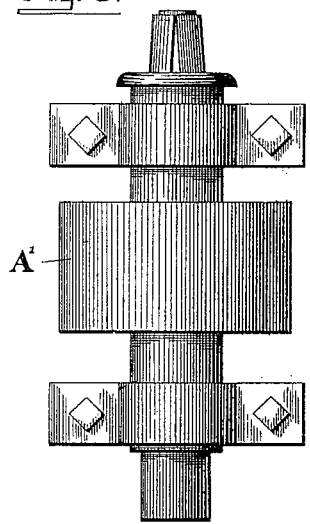
Figure 8:
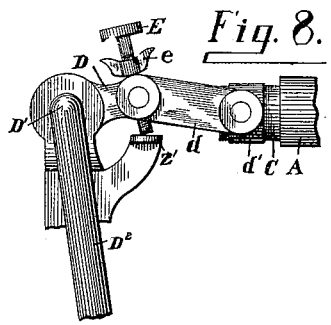

Figure 1 is a side elevation of one form of the machine complete. Fig. 2 is a top plan view of the machine shown in Fig. 1. Figs. 3, 4, and 5 are detail views of the chuck when used in a vertical position and the weight substituted for the spring. Fig. 6 is a longitudinal section of the chuck and guiding-sleeve, and Fig. 7 is a detail of end of chuck or face. Fig. 8 is a detail showing the position of the links and lever when the chuck is pushed forward.

A designates a sleeve or "variator" journaled in bearings $z\ z$ in the frame Z. This sleeve is capable of both rotary and longitudinal movement in its bearings and is provided with a pulley $a$, which may be stepped, if desired, said pulley being preferably mounted on the sleeve between the journals. When the holder is to be used in a horizontal position, as in Fig. 1, a spring B is interposed between the pulley and the front bearing, so as to push the sleeve backward, the rearward movement of the sleeve being controlled, however, by a flange $a'$ on the front end thereof, as shown.

At the front end of the sleeve the bore thereof is contracted to form a conical guide $a^2$ for the tapered end of a chuck C, which is loosely mounted in the sleeve and projects therethrough, as shown. This chuck is preferably a tube the forward end of which forms the chuck proper, being quartered by longitudinal splits $c$, so as to form the blank-holder. (See Figs. 6 and 7.) The forward end of the chuck is also reduced in diameter for a short distance and tapered or made conical, as at $c^2$, to engage with the tapered shoulder $a^2$ of the sleeve, so that as the chuck is forced forward through the sleeve the engagement of part $c^2$ with part $a^2$ contracts the chuck, as is obvious. The chuck and sleeve are prevented from rotating independently of each other by means of a spline or feather $C'$ at the rear end thereof, as shown, or by any other suitable means; but the chuck is capable of a longitudinal movement independent of and through the sleeve. The rear end of the chuck is provided with a groove $c'$, in which is secured a collar $d'$, that is pivotally connected by links $d$ to a vibrating arm D, mounted on the rocking shaft D', which is operated by a hand-lever $D^2$, so that by vibrating this lever $D^2$ the chuck is reciprocated within the sleeve. The extent of forward movement of the chuck is therefore dependent upon the downward movement of lever $D^2$, and the extent of this movement is controlled by a bolt E, tapped through the arm D and provided with a jam-nut $e$, the lower end of bolt E being adapted to engage with a stop $Z'$ on the frame Z or some other suitable arresting device, so that by adjusting this bolt the extent of forward movement of the chuck is regulated, as is obvious. The sleeve may move more or less with the chuck, as hereinafter explained.

F designates the facing or finishing tool, secured in the bracket $Z^2$ on the bed-plate, as usual, opposite the end of the chuck and in position to engage with the blank held by the chuck when the latter is pushed forward toward the tool. When the chuck is pushed forward, it slides through the sleeve until part $c^2$ jams against the part $a^2$, which will occur when the chuck is more or less projected through the sleeve, according to the size of the blank held in the chuck-head, which will more or less vary its diameter. As soon as the chuck jams in the sleeve the latter is moved forward with the chuck, as is obvious, against the tension of the spring, (or against the gravity of the chuck and weight when the chuck is used in a vertical position, as in Figs. 3, 4, and 5,) thus causing the chuck to firmly clamp the blank and hold the same while it is being operated upon. When the cutting is finished, handle $D^2$ is raised, drawing back the chuck, and the spring or weight draws back the sleeve, with the chuck, until the flange $a'$, striking bearing $z$, arrests the movement of the sleeve. Then the further rearward movement of the chuck allows it to expand and release the blank. The sleeve may be grooved, as at $a^3$, or perforated, as at $a^4$, to permit the escape of any dust which might collect between the chuck and the sleeve.

In Figs. 3, 4, and 5 the chuck and sleeve are illustrated as used in a vertical position, and the construction and operation thereof are similar to that shown in Figs. 1 and 2, with the exception that the spring B may be dispensed with, as the pulley $A'$ can be made solid, and its weight, added to that of the sleeve, is sufficient to insure the proper closure of the chuck and the proper grip of the button thereby.

Operation: When the machine is at rest, the chuck is open and it is only necessary to depress handle $D^2$, which causes the chuck to close on the blank while moving in direction of the tool. The chuck stands open when retracted, and after a blank is placed in its jaws handle $D^2$ is depressed and the chuck moved forward and closes as the enlarged part of chuck enters the tapering portion of the sleeve or variator. The sleeve then moves forward with the chuck until the bolt E strikes the stop $Z'$. This stops both sleeve and chuck. Should the blank in the chuck not reach the tool, or on the other hand, go too far forward, by adjusting the screw E to suit the size of blanks being operated upon the operator can cut the buttons according to the material—that is, he does not have to set the chuck for each and every button cut. The machine is set for a certain size, and no change is needed until a lot of thicker or thinner blanks is to be put through. The spring or weight on the sleeve holds the sleeve back or down, and it is this tension or weight that keeps the chuck closed when it is forced forward through the sleeve.

The main trouble with prior chucks commonly used is as follows: In the common form of chucks they are projected to receive a blank and closed on the blank as they are retracted. The material—that is, blanks—is not all of uniform diameter. When a blank is large, it expands the chuck more; but when this chuck goes back into the seat, where it must be during the operation of cutting, it will project farther than if a button of less diameter were in it, and since the tool is stationary it follows that a large blank will make a thin button, while one less in diameter will be turned out thick. Another serious matter with chucks of this old class is that the operator is continually running into the chuck with his tool, as he must be continually changing the throw.

The great trouble in finishing pearl buttons from the blanks is that they are not all cut perfectly of the same diameter, and the chucks that are now in use either lengthen or shorten, according to the variation in the diameter of the blanks. It will be seen that when the blank is of a large diameter the chuck will be dropped back, and when the tool is brought up to the blank if the chuck projects out farther than it ought the tool runs into the face of the chuck and either entirely ruins it or cuts the gripping portion from the chuck, and thereby causes both the breaking of the material and the stopping of the machinery for repairs. My invention overcomes this entirely, as the different diameters do not affect the operation on the blank. The chuck is set to run a required distance from the tool to make a certain thickness, and this is not affected by the variation in size of blanks. Consequently the product will be uniform in thickness. It will also be noted that my chuck can be used in either a horizontal or vertical position. When used in a vertical position, the weight of the pulley and sleeve is sufficient to close the chuck and hold the blank as the sleeve is forced upward. When used in a horizontal position, a spring may be used to hold the sleeve back, which answers the same purpose as the weight in the vertical chuck. The feed device for the horizontal chuck shown in Figs. 1 and 2 moves the chuck up to the tool rapidly until it gets near to it, and then, as the link straightens out, while the tool is doing its work the chuck is moved slowly, though the handle may be moved uniformly. The feed on the vertical chuck may be worked by the same devices or by a cam or other mechanical movement.

In Figs. 3, 4, and 5 I have illustrated the operation of the invention. Fig. 3 shows the chuck down ready to receive a button-blank. It is to be noted that the chuck is down to an imaginary base-line, (indicated at W.) Pressure is brought to bear on the end of the chuck C by levers, cams, or in any other way. By referring to Fig. 4 it will be seen that the pressure has moved chuck C up from base-line, and a glance at the quartered end of the chuck will reveal the fact that it has closed, gripping the button-blank. Pressure still bearing on the end of the chuck, the tapering part comes in contact with the tapering part of the sleeve. The chuck then carries sleeve forward or upward with it, which will be seen by reference to base-line, Fig. 5. Now if the sleeve did not travel with the chuck its distance of travel would vary according to the diameter of the material placed in the chuck, for however careful men may be in sawing out the button-blanks there will be quite a variation in them. For instance, in sawing twenty-line buttons they will vary from nineteen and one-half lines to twenty and one-half lines, a line in button parlance being one-fortieth of an inch. Therefore a twenty-line button would be one-half of an inch in diameter. Now it will be understood that with my chuck if it is wished to throw it, say, one inch it makes no difference whether the buttons vary one or two lines the head of the chuck goes forward to exactly the same point each time it is thrown forward, the variating-sleeve being lifted or carried forward with the chuck more or less according to the expansion of the chuck-head.

Having thus described my invention, what I therefore claim as new, and desire to secure by Letters Patent thereon, is—

1. In a button-facing machine, the combination of a rotatable and longitudinally-movable sleeve or variator, and a rotatable and longitudinally-movable chuck within the sleeve, and means for moving said chuck a uniform distance, said sleeve being adapted to rotate the chuck and to cause the closure thereof as it is moved forward therein, for the purpose and substantially as described.

2. In a button-making machine, the combination of a rotatable and longitudinally-movable sleeve, having its bore contracted near its front end; with a chuck supported in and projecting through said sleeve, having a contracted portion adapted to engage the contracted bore of the sleeve so as to cause the closure of the chuck as it is projected through the sleeve, means for rotating said sleeve and thereby rotating the chuck and means for moving the chuck a uniform distance.

3. In a button-making machine, the combination of a rotatable and longitudinally-movable sleeve, having its bore contracted near its front end, a chuck within the sleeve having a longitudinal movement independent of, and projecting through said sleeve, and having a contracted portion adapted to engage the contracted bore of the sleeve, so as to cause the closure of the chuck thereby as it is projected through the sleeve, means for positively rotating the sleeve and thereby rotating the chuck and means for moving the chuck a uniform distance, the sleeve being also movable with and by the chuck after it has caused the latter to grip the button.

4. The combination of the rotatable and longitudinally-movable sleeve, the chuck supported within and rotatable with said sleeve, means for positively rotating the sleeve and thereby rotating the chuck and means for reciprocating said chuck within the sleeve, the sleeve being movable with the chuck after it has caused the latter to grip the blank, substantially as described.

5. The combination of the rotatable and longitudinally-movable sleeve, the chuck supported within and rotatable with and by said sleeve, and means for reciprocating said chuck within the sleeve, the sleeve being movable with the chuck after it has caused the latter to grip the blank, means for positively rotating the sleeve and thereby rotating the chuck and means for returning the sleeve to normal position when the chuck is retracted, substantially as described.

6. The combination of a rotatable and longitudinally-movable sleeve provided with a conical or contracted portion near its front end, a longitudinally-movable chuck supported within and projecting through said sleeve and rotatable therewith, means for positively rotating the sleeve and thereby rotating the chuck and means for reciprocating said chuck a positive distance, said chuck having a tapered portion adapted to engage the contracted portion of the sleeve, which causes the chuck to grip the blank and the sleeve to move forward with the chuck, substantially as described.

7. The combination of a rotatable and longitudinally-movable sleeve provided with a conical or contracted portion near its front end, a longitudinally-movable chuck independent of, within and projecting through said sleeve and rotatable therewith, means for positively rotating the sleeve and thereby rotating the chuck and means for reciprocating said chuck a positive distance, said chuck having a tapered portion adapted to engage the contracted portion of the sleeve, which causes the chuck to grip the blank and the sleeve to move forward with the chuck; with means for causing the sleeve to return to normal position when the chuck is retracted whereupon when the sleeve is arrested the further movement of the chuck causes it to disengage the contracted portion of the sleeve, allowing the chuck to expand and release the blank, and means for rotating the chuck and the sleeve, for the purpose and substantially as described.

8. The combination of a rotatable and longitudinally-movable chuck, a rock-shaft, arm and links for reciprocating said chuck during certain distances; with an adjustable bolt tapped through said arm and adapted to engage a stop whereby the forward movement of the chuck can be regulated.

9. The combination of a rotatable and longitudinally-movable sleeve, and a rotatable and longitudinally-movable chuck therein; and rotated thereby, and means for positively rotating said sleeve with a rock-shaft, arm and links for reciprocating said chuck during certain distances, said sleeve being partially movable with the chuck and causing the chuck to hold and release the blanks, substantially as described.

10. The combination of a rotatable and longitudinally-movable sleeve, a chuck rotatable with and movable longitudinally in said sleeve adapted to receive and hold a blank when projected, a rock-shaft, arm and links for reciprocating said chuck during certain distances; with means for limiting the movement of said arm whereby the forward movement of the chuck can be regulated.

11. The combination of the rotatable and longitudinally-movable sleeve, and a pulley for rotating the sleeve, the longitudinally-movable chuck within and rotatable with the sleeve and projecting therethrough, the forward end of said chuck being tapered and adapted to engage an internal taper of the sleeve whereby the chuck is closed upon the blank as it is moved forward and also causes the sleeve to move with the blank; and means for positively rotating the chuck and thereby rotating the blank with means for imparting a positive extent of linear movement to the chuck, and means for returning the sleeve to normal position as the chuck is retracted, for the purpose and substantially as described.

12. The combination of the rotatable and longitudinally-movable sleeve, and a pulley for rotating the sleeve, and means for returning it to normal position after displacement, the longitudinally-movable chuck within and rotatable with the sleeve and projecting therethrough, the forward end of said chuck being tapered and adapted to engage the internal taper of the sleeve whereby the chuck is closed upon the blank as it is moved forward and also causes the sleeve to move with the blank; with the rock-shaft, its arm and links for imparting a positive extent of linear movement to the chuck, and the adjustable bolt and stop for regulating the extent of movement of the chuck all substantially as and for the purpose set forth.

In testimony that I claim the foregoing as my own I affix my signature in presence of two witnesses.

NICHOLAS BARRY, Jr.

Witnesses:
CHAS. TAPPE,
MARTIN W. STAPLETON.